United States Patent
Vardhan et al.

(10) Patent No.: US 11,489,804 B2
(45) Date of Patent: Nov. 1, 2022

(54) PERSONALIZATION OF DELIVERY OF NOTIFICATIONS

(71) Applicant: McAfee, LLC, San Jose, CA (US)

(72) Inventors: Raj Vardhan, Uttar Pradesh (IN); Arvind Sankarasubramanian, Bangalore (IN); Kranthi Kumar Gadde, Bangalore (IN); Srikanth Nalluri, Karnataka (IN); Dattatraya Kulkarni, Bangalore (IN)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 17/127,609

(22) Filed: Dec. 18, 2020

(65) Prior Publication Data

US 2021/0105241 A1     Apr. 8, 2021

Related U.S. Application Data

(63) Continuation of application No. 15/201,397, filed on Jul. 2, 2016, now Pat. No. 10,887,266.

(30) Foreign Application Priority Data

Apr. 13, 2016    (IN) .............................. 201641012952

(51) Int. Cl.
    *H04L 12/58*       (2006.01)
    *H04L 51/224*     (2022.01)
    *H04W 4/06*       (2009.01)
    *H04L 67/306*     (2022.01)
    *H04L 51/214*     (2022.01)
    *H04L 67/55*      (2022.01)
    *H04L 12/18*      (2006.01)

(52) U.S. Cl.
CPC .......... *H04L 51/224* (2022.05); *H04L 51/214* (2022.05); *H04L 67/306* (2013.01); *H04L 67/55* (2022.05); *H04W 4/06* (2013.01); *H04L 12/1895* (2013.01)

(58) Field of Classification Search
CPC ......... H04L 51/24; H04L 51/14; H04L 67/26; H04L 67/306; H04W 4/06
USPC ....................................................... 709/206
See application file for complete search history.

(56) References Cited

U.S. PATENT DOCUMENTS 5,987,610 A    11/1999   Franczek et al.
6,073,142 A     6/2000   Geiger et al.
(Continued)

FOREIGN PATENT DOCUMENTS

KR     1020140027892 A1    3/2014

OTHER PUBLICATIONS

Cuttrell, Edward B., et al., "Effects of Instant Messaging Interruptions on Computing Tasks," Microsoft Research, ACM 2000, 2 pages.
(Continued)

*Primary Examiner* — Glenford J Madamba
(74) *Attorney, Agent, or Firm* — Patent Capital Group (57) ABSTRACT

Particular embodiments described herein provide for system that can be configured to deliver a notification to a user based on the user's preference for each device that receives the notification. The user's preference is based on how the user interacted with similar notifications in the past and the system can change how it will deliver similar notifications to the user in the future based on how the user interacts with the notification.

14 Claims, 7 Drawing Sheets

(56) References Cited

U.S. PATENT DOCUMENTS

| | | | |
|---|---|---|---|
| 6,460,050 B1 | 10/2002 | Pace et al. | |
| 7,506,155 B1 | 3/2009 | Stewart et al. | |
| 2004/0128359 A1* | 7/2004 | Horvitz | H04L 67/26 709/207 |
| 2009/0254944 A1 | 10/2009 | Watson et al. | |
| 2014/0057606 A1* | 2/2014 | Kunjithapatham | H04L 51/14 455/412.2 |
| 2014/0372423 A1* | 12/2014 | Majumder | G06F 16/9535 707/725 |
| 2015/0081372 A1* | 3/2015 | Boss | H04M 19/04 705/7.19 |
| 2016/0255034 A1* | 9/2016 | Yuan | H04L 51/22 709/206 |
| 2017/0302609 A1 | 10/2017 | Vardhan | |

OTHER PUBLICATIONS

Freed, Michael et al., "RADAR: A Personal Assistant that Learns to Reduce Email Overload," AAAI, 2008, 7 pages.

Horvitz, Eric, et al., "Attention-Sensitive Alering*," Proceedings of the Fifteenth conference on Uncertainty in artificial intelligence, Morgan Kaufmann Publishers Inc., 1999, 10 pages.

* cited by examiner

PERSONALIZATION OF DELIVERY OF NOTIFICATIONS

CROSS-REFERENCE TO RELATED APPLICATIONS

This application is a continuation of U.S. patent application Ser. No. 15/201,397 filed Jul. 2, 2016, and titled "PERSONALIZATION OF DELIVERY OF NOTIFICATIONS" and relates to Provisional Application No. 201641012952, entitled "PERSONALIZATION OF THE DELIVERY OF NOTIFICATIONS" filed in the Indian Patent Office on Apr. 13, 2016, all of which are hereby incorporated by reference.

TECHNICAL FIELD

This disclosure relates in general to the field network communication, and more particularly, to the personalization of delivery of notifications.

BACKGROUND

Device notifications are a platform that applications and services use to engage with users on a variety of user devices (e.g., wearables, smartphones, tablets/PCs, smart TV, smart cars, etc.). However, a major pain point with the devices can occur when the notification platform is being abused to deliver unwanted notifications, mainly intended to increase application engagement and/or promotions. As a result, handling of notifications on a device can consume significant user time and attention.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth example embodiments of apparatuses, methods, and systems relating to a communication system for the personalization of delivery of notifications. Features such as structure(s), function(s), and/or characteristic(s), for example, are described with reference to one embodiment as a matter of convenience; various embodiments may be implemented with any suitable one or more of the described features.

Figure 1:
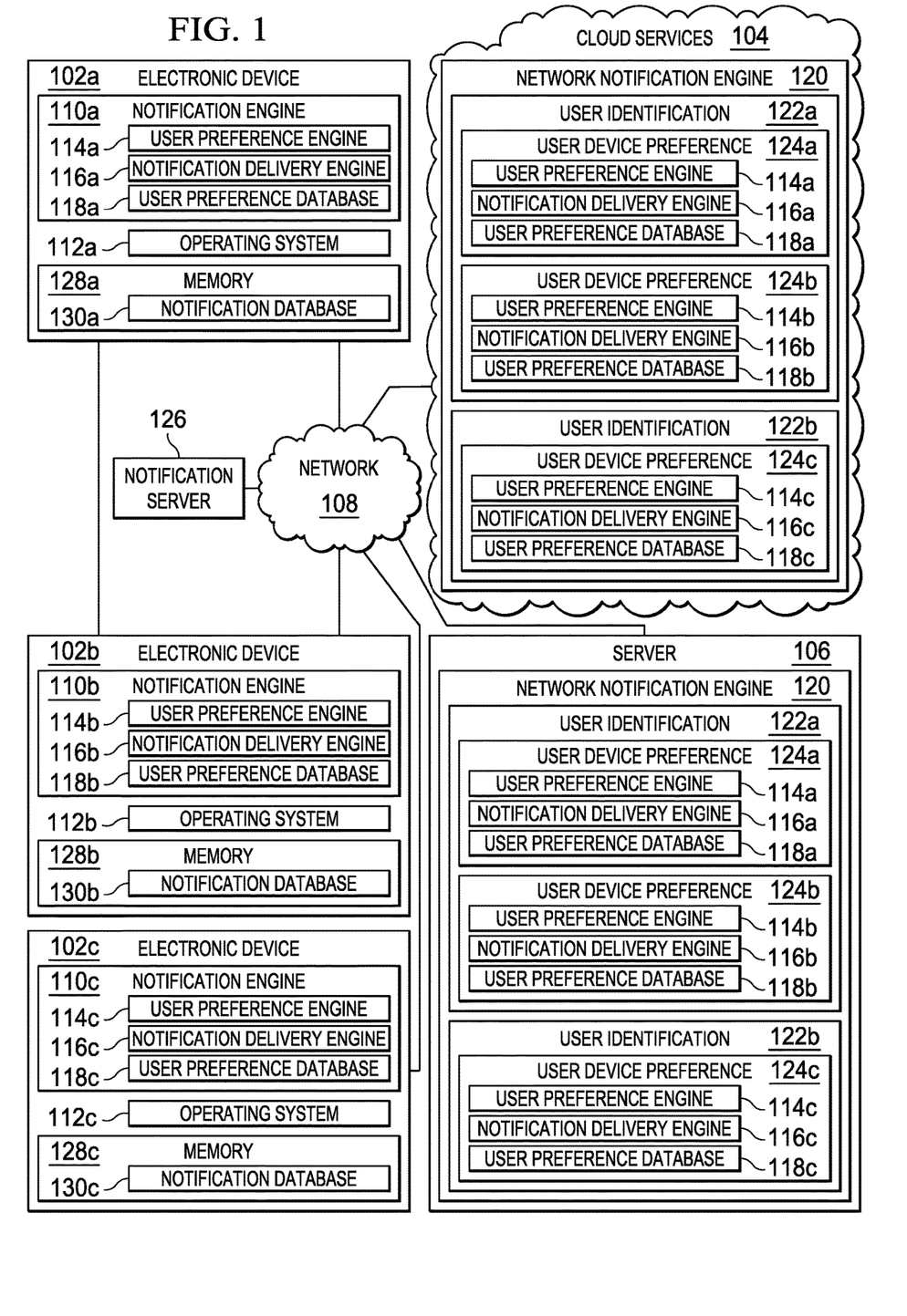
FIG. 1 is a simplified block diagram of a communication system for the personalization of delivery of notifications in accordance with an embodiment of the present disclosure.

FIG. 1 is a simplified block diagram of a communication system 100 in accordance with an embodiment of the present disclosure. Communication system 100 can include one or more electronic devices 102a-102c, cloud services 104, and a server 106. Electronic devices 102a-102b, cloud services 104, and server 106 can communicate with each other using network 108.

Electronic device 102a can include a notification engine 110a and an operating system 112a. Notification engine 110a can include a user preference engine 114a, a notification delivery engine 116a, and a user preference database 118a. Electronic device 102b can include a notification engine 110b and an operating system 112b. Notification engine 110b can include a user preference engine 114b, a notification delivery engine 116b, and a user preference database 118b. Electronic device 102c can include a notification engine 110c and an operating system 112c. Notification engine 110c can include a user preference engine 114c, a notification delivery engine 116c, and a user preference database 118c. Each operating system 112a-112c may be the same operating system, one or more may be the same operating system, or each may be different.

Cloud services 104 and server 106 can each include a network notification engine 120. Network notification engine 120 can include one or more user identifications 122a and 122b. User identification 122a can include a user device preferences 124a and 124b. User device preferences 124a can include user preference engine 114a, notification delivery engine 116a, and user preference database 118a. User device preferences 124b can include user preference engine 114b, notification delivery engine 116b, and user preference database 118b. User identification 122c can include a user device preferences 124c. User device preferences 124c can include user preference engine 114c, notification delivery engine 116c, and user preference database 118c. Note that if the user associated with user identification 112c is associated with more than one device, then user identification 112c can include a user device preferences for each device associated with the user. For example, if a user is associated with user identification 122a owns user devices 102a and 102b, then user identification 112a can include user device preference 124a and 124b, as illustrated in FIG. 1.

For example, user identification 122a and 122b are each associated with a user. User identification 122a and 122b can each include a user device preference for each device associated with the user. For example, if a user associated with user identification 122a is associated with electronic devices 102a and 102b, then electronic device preference 124a could be associated with electronic device 102a and electronic device preference 124b could be associated with electronic device 102b. Also if a second user is associated with electronic device 102c, then electronic device preference 124c could be associated with electronic device 102c.

Each user preference engine 114a-124c can be configured to determine a user's preference as to how a notification should be delivered or a user's preference as to how a group of related notifications should be delivered. The notification can be delivered to a user associated with a particular user preference engine (e.g., user preference engine 114a is associated with electronic device 102a, user preference engine 114b is associated with electronic device 102b, and user preference engine 114c is associated with electronic device 102c) using a display, by a sound, by a visual signal, by physical movement of the electronic device such as a vibration alert or any combination of on a display, using sound, some visual signal, and/or movement or vibration. The delivery of the notification can also include storing the notification for later viewing, ignoring or deleting the notification, etc.

Each notification delivery engine 116a-116c can be configured to deliver the notification in the manner determined by a corresponding user preference engine 114a-114c. For example, if user preference engine 114a determines that a notification should be displayed only on a display of electronic device 102a, then notification delivery engine 116a can be configured to display the notification on a display. If user preference engine 114b determines that a notification should be delivered using a sound from electronic device 102b, then notification delivery engine 116b can be configured to deliver the notification using a sound from electronic device 102b or to alert the user of the notification using a sound from electronic device 102b. If user preference engine 114c determines that a notification should be delivered using a visual alert from electronic device 102c, then notification delivery engine 116c can be configured to deliver the notification using a visual alert from electronic device 102c or to alert the user of the notification using an illumination source (e.g., one or more light emitting diodes (LEDs)) from electronic device 102c. The visual alert can include an alert on a display such as a graphic alert, static display, graphics interchange format (GIF), video alert or some other type of moving graphic, etc. The visual alert could also include one or more different colored LEDs that flash or illuminate in a distinct pattern or sequence.

Each user preference database 118a-118c can be configured to store the user's preference as to how a notification or a group of related notifications should be communicated to the user on an associated electronic device 102a-102c. For example, user preference database 118a may include an entry where notifications related to sales are to be stored in notification database 130a while notifications about traffic alerts are to be displayed on a display of electronic device 102a. User preference database 118b may include an entry where notifications related to sales are to be ignored or stored in notification database 130b while notifications about traffic alerts are to trigger an audio alert from electronic device 102b. User preference database 118c may include an entry where notifications related to sales are to be ignored or stored in notification database 130c while notifications about traffic alerts are to trigger a visual alert from electronic device 102c. Notification databases 130a-130c can each be configured to store notifications for later retrieval by a user.

In an example, a notification server 126 can send a notification to a user. Notification server 126 can be any server or network element that may send a notification to a user. The notification can be received by an operating system (e.g., operating system 112a) and a notification engine (e.g., notification engine 110a) can determine how to deliver the notification to the user. In another example, the notification from notification server 126 may be sent to the user through cloud services 104 or server 106. Network communication engine 120 can determine how to deliver the notification to the user. The notification can include a message or notification related to a business entity, sales, commercial activity, personal contacts such as friends, family members, co-workers, etc., traffic alerts, weather, news, low battery alert for a specific device, or any other type of message or notification a user might receive. The delivery of the notification can be based on the user's preference for the delivery of similar previous notifications. Similar notifications can include notifications of the same type (e.g., related to a business entity, sales, commercial activity, personal contacts such as friends, family members, co-workers, etc., environment alerts, traffic alerts, weather alerts, news, low battery alert for a specific device, etc.), the same priority, notifications that have the same amount time the notification stayed on the system, when the notification was created or delivered, the sender of the notification, keywords included in the notification, the type of notification (e.g., text, email, voice memo, tweet, snap chat, etc.), the length of the notification, or other common data or attributes of the notifications.

In an example, to determine if a notification is similar to previous notifications and to determine a user preferred action for the notation, a tree approach model may be used. Post training, decision tree—nodes can include information related to each notification such as sender name, application name, message class, time of day the notification was sent or received, etc. Each node can lead to leaf values such as click, remove, ignore, etc. through different branches. To predict action for the notification, the system can pass notification details to notification engine 110a and determine a user preferred action for the notification.

More specifically, notification database 130a can include a training database created using samples such as "Sender=CITIBANK, APP=SMS, MSG=FINANCE, TIME=AFTERNOON=>Result=CLICK,"
"Sender=CITIBANK, APP=SMS, MSG=FINANCE, TIME=MORNING=>Result=CLICK,"
"Sender=CITIBANK, APP=SMS, MSG=FINANCE, TIME=EVENING=>Result=CLICK." Note that if a tree model approach is used, a node for the time of day may be ignored as it does not cause any branching condition. When a notification such as an SMS from CITIBANK with FINANCE information is received, the system can determine a high probability of the user clicking the notification. A new notification will be similar based on how its parameters match nodes of the tree model. For example, a notification other than an SMS from CITIBANK regarding FINANCE can be determined to have a high probability of the user clicking the notification. Some parameter values may not impact the predicted outcome (e.g., time of day) and therefore may not be a crucial part of determining the similarity criteria. While the example above includes a tree approach model, other methods (e.g., comparison algorithm, string matching algorithm, pattern matching algorithm, rolling hash, etc.) may be used to determine the relevance of a notification or the similarity of one notification to another notification.

In an example, a similarity score can be assigned to each notification. More specifically, a notification such as an SMS from CITIBANK with FINANCE information can be determined to have a probability score of 0.9, indicating that the user is very likely to click the notification. A notification other than an SMS from CITIBANK regarding FINANCE can be determined to have a probability score of 0.8 indicating the user is likely to click the notification. A notification other than an SMS from RANDOM_NAME regarding FINANCE can have a probability score of 0.4 indicating that the user is not likely to click the notification. In a specific example, if a tree approach model is used, each node of the tree can have a weighted score assigned to the node. For example, a node related to FINANCE can have less weight than a node related to CITIBANK. Other methods can be used to calculate a similarity score for a notification and the other methods may or may not include weighted elements.

After a notification is delivered, the action that a user takes on the notification can be used to signify the relevance of the notification to the user. Actions such as remove, ignore and click signify to some extent no-relevance, low-relevance and high-relevance respectively. In order to personalize delivery on any device or form-factor, the system can observe how a user interacts with the notification on different devices and derive what kind of notifications a user clicked, removed or ignored. Therefore, probability scores of the predicted action being click, remove or ignore obtained from notification engine 110a in turn gives the relevance as well the probability of the user taking a click action on the notification.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

End users have more communications choices than ever before. A number of prominent technological trends are currently afoot (e.g., more computing devices, more connected devices, etc.). One current trend is device notifications. Device notifications have become a platform that applications and services are using to engage with users on a variety of user devices (e.g., wearables, smartphones, tablets/PCs, smart TV, smart cars, etc.). However, a major pain point can occur when the notification platform is being abused for delivering unwanted notifications, mainly intended to increase application engagement and/or promotions. As a result, handling of notifications consumes significant user time and attention. What is needed is a system and method to manage notifications.

One solution is to clear all the notifications at once but while choosing to clear all of the notifications at once seems like an immediate solution, the user can inadvertently miss important/critical notifications. To provide some relief in dealing with a large number of notifications, current operating systems allow users to completely mute notifications from certain applications. However, if users choose to do so, they are at the risk of not being notified of information that might actually be of relevance to them. The need to prevent notification overload has been identified by developers of popular operating systems. For example, some systems allow users to disable certain applications from generating any notifications. The problem with this approach is that users who opt to block certain applications from creating notifications are at risk of missing notifications that might be of some relevance to them. Note that current smartphones do not provide any logging of notifications; if notifications from an application are blocked, there is no way a user can view them later. What is needed is an interruption system or notification manager that can be configured to allow for an improved serving of notifications to the users where irrelevant notifications can be either auto dismissed, deferred for later viewing, or served silently.

A communication system for the personalization of delivery of notifications, as outlined in FIG. 1, can resolve these issues (and others). Communication system 100 can be configured to allow for an improved serving of notifications to the users where irrelevant notifications can be either auto dismissed, deferred for later viewing, or served silently. Relevant notifications can be served with a priority level that is governed by how relevant the notification is to the user on different form factors. The relevancy can also be used to determine on what user device(s) the notifications are served and how the notifications are served.

In an example, a notification engine (e.g., notification engine 110a or network notification engine 120) can be configured to determine the relevance of different notifications to a user and the user's preference for handling the notifications. More specifically, the notification engine can be configured to continuously create and analyze data from a knowledge base of past user actions and not just depend on semantics of incoming notifications. User interaction with a notification, such as click, remove, ignore, etc. can be monitored and used to provide clues to the relevance of similar future notifications to the user on a specific form factor (e.g., electronic device 102a, 102b, and 102c). As used herein, the term "click" is to include an action by the user that indicates the user has taken some action regarding the notification other than delete or ignore. For example, a click on a notification can include selecting the notification, forwarding the notification, posting the notification, printing the notification, presenting the notification to a retail device associated with the notification, etc.

In an example, user preference engine (e.g., user preference engine 114a) can be configured to build such a knowledge base by interpreting user interactions with notifications and enabling creation of a notification delivery engine (e.g., notification delivery engine 116a) that reduces notification overload by communicating notifications and/or alerts regarding a notification on appropriate devices based on their perceived relevance. Because a user may interact with the same notification differently on different form factors, the relevance of notifications determined by the system can vary by each form factor. For example, a user's preferences for a notification may be different for each electronic device 102a-102c. In one implementation, high priority notifications can be coupled with LED blinks and vibration alerts on one device while only vibration alerts are used on another device. To determine a user preferred notification for a specific device, the system can be configured to perform an AB type test by trying out different hardware capabilities on different times that a notification is received (e.g., use an LED blink on some occasions, vibration on other occasions, and both an LED blink and vibration on other occasions), and see if one or the other causes the user to increase clicks for the notification.

More specifically, notification engine 110a can determine that a notification should be delivered to a wearable device (e.g., a smart-watch). The notification delivery engine 116a can then determine that the notification content should be customized so that it fits into a display on the wearable device, emits a proper audio signal, and/or emits a proper visual signal and notification engine 110a can communicate the notification to the electronic device. As the display of notifications varies across form factors (e.g., like wearables, smart phones, websites etc.), the customization of the notification content can make the notification more effective in terms of being viewable on the display. In addition, battery usage can be improved by reducing resolution of images that are being sent in notification content to different devices. In some instances, a device may not include a display and the notification may consist of an audio signal or alert and/or a visual signal or alert.

The system (e.g., using notification engine 110a or network notification engine 120) can be configured to classify the relevance of incoming notifications into high, medium or low based on the semantics of the notification content, reputation of application pushing notification to the device, the relationship of the user with sender if any, the form factor where notification are to be delivered, and user specific knowledge such as knowledge about how the user has been interacting with different kinds of notifications in the past on different form factors.

Notifications may be delivered using an appropriate delivery mechanism, based on the classification of notification relevance for available form factors. This can include identifying on which device(s) to deliver the notification and how to deliver the notification based on a corresponding relevance scores. For example, a notification may be relevant on one form factor (e.g., a mobile device or laptop computer) and not relevant on another device (e.g., a smart-watch, wearable computer, smart car, etc.) depending upon how the user has been interacting with such notifications on each of the form factors.

Over time, the system can personalize the classification (and in turn delivery) of a notification based on how the user consumes different notifications (e.g., click, remove, ignore, etc.) on different form factors. The process can be continuous and closed loop where personalization improves classification accuracy, which in turn improves user experience by delivering notifications as the user expects them to be delivered. Almost any standard classifier may be used to classify a notification and can be based on the semantics of the notification content. The delivery mechanism can use OS provided controls such as color and/or frequency of LED illumination, sounds, vibrations, deferrals, forwards, etc., to modify the delivery of the notification. In additional, the delivery mechanism can be based on the classification of the notification and on user preferences as determined by the system.

After a notification is delivered, the action that a user takes regarding the notification can signify the relevance of the notification to the user. For example, actions such as remove, ignore and click can signify, to some extent, no relevance, low relevance and high relevance respectively. To personalize delivery on a form factor, the notification engine can monitor, analyze, and derive what kind of notifications a user clicked, removed or ignored. In an example, this can be achieved by monitoring and subsequently analyzing multiple notifications and OS triggered system events such as notification post, remove, and/or delete. The system can be configured to derive a user's intent with respect to a notification and infer indirect actions related to the notification. The result is a knowledge-base of notification characteristics and corresponding user actions, or lack of action, determined to be taken with respect to the notification, which can be stored in a user preference database (e.g., user preference database 118a-118c) associated with a particular device.

This knowledge base can be useful and serve as a training set to a user preference database (e.g., user preference database 118a and 118b) that seeks to determine how a user typically acts when receiving different kinds of notifications on different devices (e.g., electronic devices 102a and 102b). With time, given the characteristics of the notification and the knowledge base of past actions for different notifications, the user preference database can be able to classify an action for a new notification.

For example, the system can allow the notification engine to automatically dismiss irrelevant notifications that a user typically removes, silently deliver less relevant notifications that the user is likely to ignore, amplify the delivery of relevant notifications that user normally clicks upon, or other actions based on the relevance of the notification. Also, the system can be configured to manage differential delivery of notifications to different form factors such as mobile devices, desktop computers, laptop computers, wearables (e.g., smart-watch), automotive screens, smart TV, Internet of things (IoT) device, etc.) The system and mechanism can be able to identify the difference between the kinds of notifications a user finds relevant on different form factors. For example, the notification engine (e.g., notification delivery engine 116a) for one device can notify a user using one method while the notification engine (e.g., notification delivery engine 116b) on another device can notify the user in a different method. For example, a user may be notified of relevant notifications such as of meeting reminders on a wearable, but notifications of on-going chat messages, can be restricted to a mobile device only. Another example could be the delivering a notification on a wearable along with a vibration effect, while delivering the notification silently on a smartphone. Similarly, only high priority notifications with a sense of urgency may be displayed on auto form factors such as a smart car, thus keeping irrelevant notifications from distracting the user.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a-102c, cloud services 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic devices 102a-102c, cloud services 104, and server 106 can include memory elements for storing information to be used in the operations outlined herein. Each of electronic devices 102a-102c, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic devices 102a-102c, cloud services 104, and server 106 may include software modules (e.g., notification engine 110a-110c, user preference engine 114a-114c, notification delivery engine 116a-116c, network notification engine 120, etc.) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a-102c, cloud services 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Each of electronic devices 102a-102c can be a network element and include, for example, desktop computers, laptop computers, mobile devices, personal digital assistants, smartphones, tablets, wearables, or other similar devices. Cloud services 104 is configured to provide cloud services to electronic devices 102a-102c. Cloud services 104 may generally be defined as the use of computing resources that are delivered as a service over a network, such as the Internet. The services may be distributed and separated to provide required support for electronic devices 102a-102c and cloud services 104. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although notification engines 110a-110c, user preference engines 114a-114c, and notification delivery engines 116a-116c, are represented in FIG. 1 as being located in electronic devices 102a-102c and network notification engine 120 is represented in FIG. 1 as being located in cloud services 104 and server 106, this is for illustrative purposes only. Notification engines 110a-110c, user preference engines 114a-114c, notification delivery engines 116a-116c, and network notification engine 120, could be combined or separated in any suitable configuration. Furthermore, notification engine 110a-110c, user preference engines 114a-114c, notification delivery engines 116a-116c, and network notification engines 120 could be integrated with or distributed in another network accessible by one or more of electronic devices 102a-102c.

Figure 2:
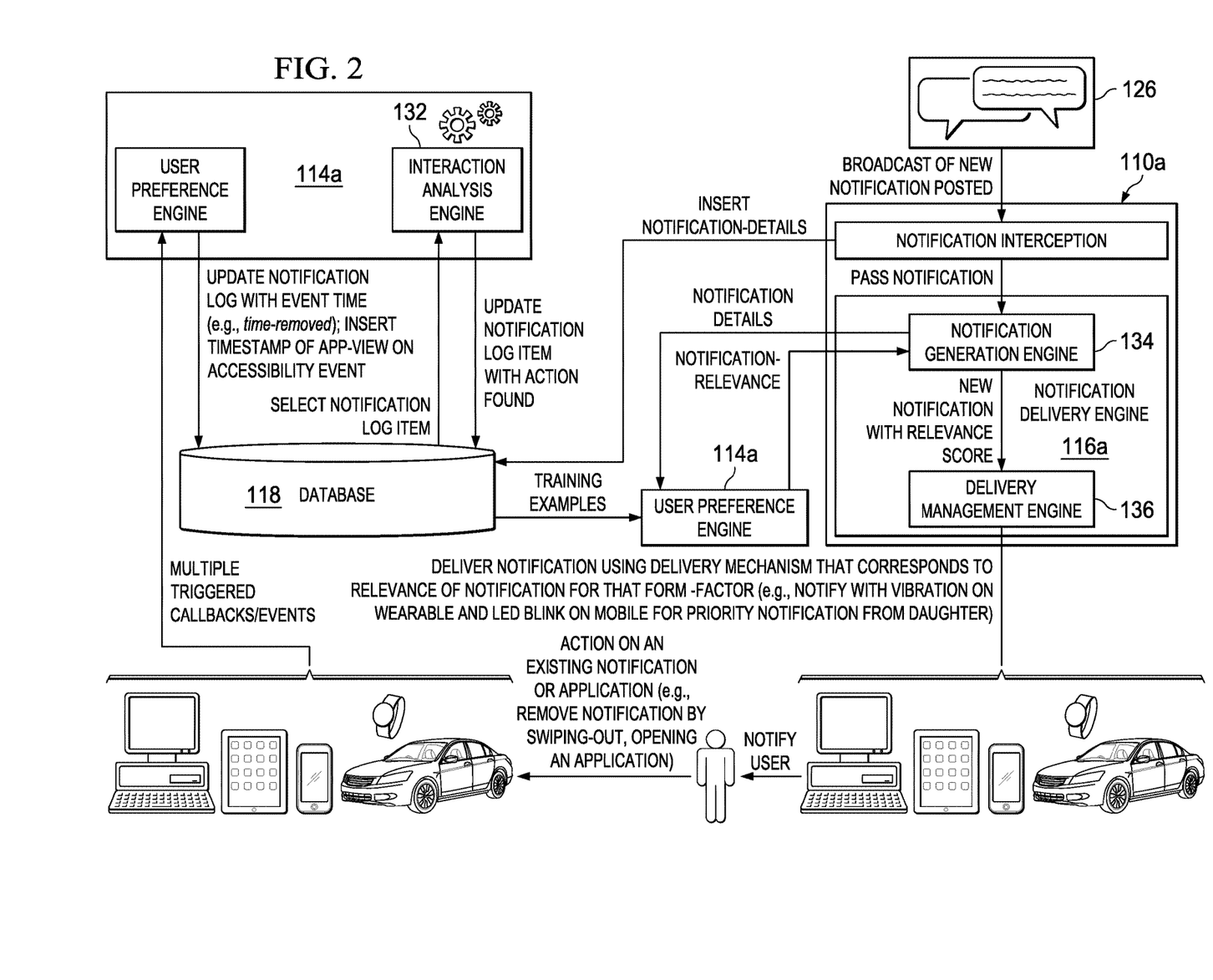
FIG. 2 is a simplified block diagram of a communication system for the personalization of delivery of notifications in accordance with an embodiment of the present disclosure.

Turning to FIG. 2, FIG. 2 is a simplified block diagram of a communication system 100 for the personalization of delivery of notifications in accordance with an embodiment of the present disclosure. As illustrated in FIG. 2, notification server 126 can send out a notification to a user. The notification can be intercepted (e.g., by notification engine 110a or network notification engine 120) and the system can determine how to communicate the notification to the user. Using a notification delivery engine (e.g., notification delivery engine 116a), the notification can be communicated to the user. If the notification is communicated to the user on more than one device, each notification delivery engine for each device can deliver the notification according to the user's preferences for a specific device.

Once the notification is delivered to the user, how the user interacts with the notification is determined. For example, event listening may be used to determine if the user clicks, deletes, or ignores the notification. How the user interacts with the notification is analyzed by an interactive analysis engine and then stored in a database (e.g., user preference database 118a). A user preference engine (e.g., user preference engine 114a) can analyze the interaction and modify how the same or similar notifications are communicated to the user in the future. As a result, over time, the system can personalize the classification (and in turn delivery) of a notification based on how the user consumes different notifications (e.g., click, remove or ignore) on different devices or form factors. The process can be continuous and closed loop where personalization improves classification accuracy, which in turn improves user experience by delivering notifications as the user expects them to be delivered.

Figure 3:
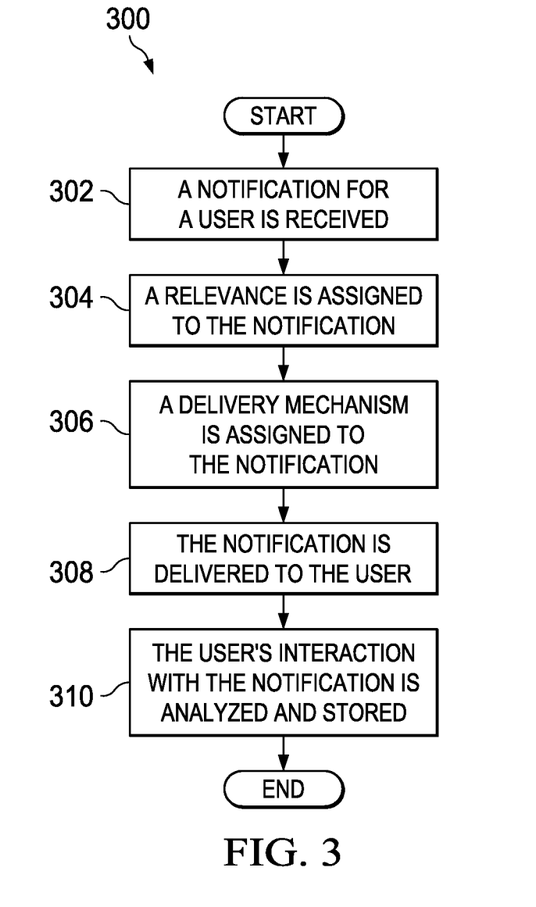
FIG. 3 is flowchart illustrating potential operations that may be associated with the communication system in accordance with an embodiment.

Turning to FIG. 3, FIG. 3 is an example flowchart illustrating possible operations of a flow 300 that may be associated with the personalization of delivery of notifications, in accordance with an embodiment. In an embodiment, one or more operations of flow 300 may be performed by notification engines 110a-110c, user preference engines 114a-114c, notification delivery engines 116a-116c, and network notification engine 120. At 302, a notification for a user is received. At 304, a relevance is assigned to the notification. For example, accessing user preference database 118a to determine the user's interaction with past notifications that are the same type or similar, the system may learn that notifications of the same type or similar are ignored or are considered very important. At 306, a delivery mechanism is assigned to the notification. For example, user preference engine 114a may determine that the notification should be stored for later viewing with no alert given to the user or may determine that a vibration and audible alert should be used to make the use aware of the notification. At 308, the notification is delivered to the user. At 310, the user's interaction with the notification is analyzed and stored. For example, the user's interaction with the notification may be stored in user preference database 118a to determine how the same type or similar notifications are to be communicated to the user in the future.

Figure 4:
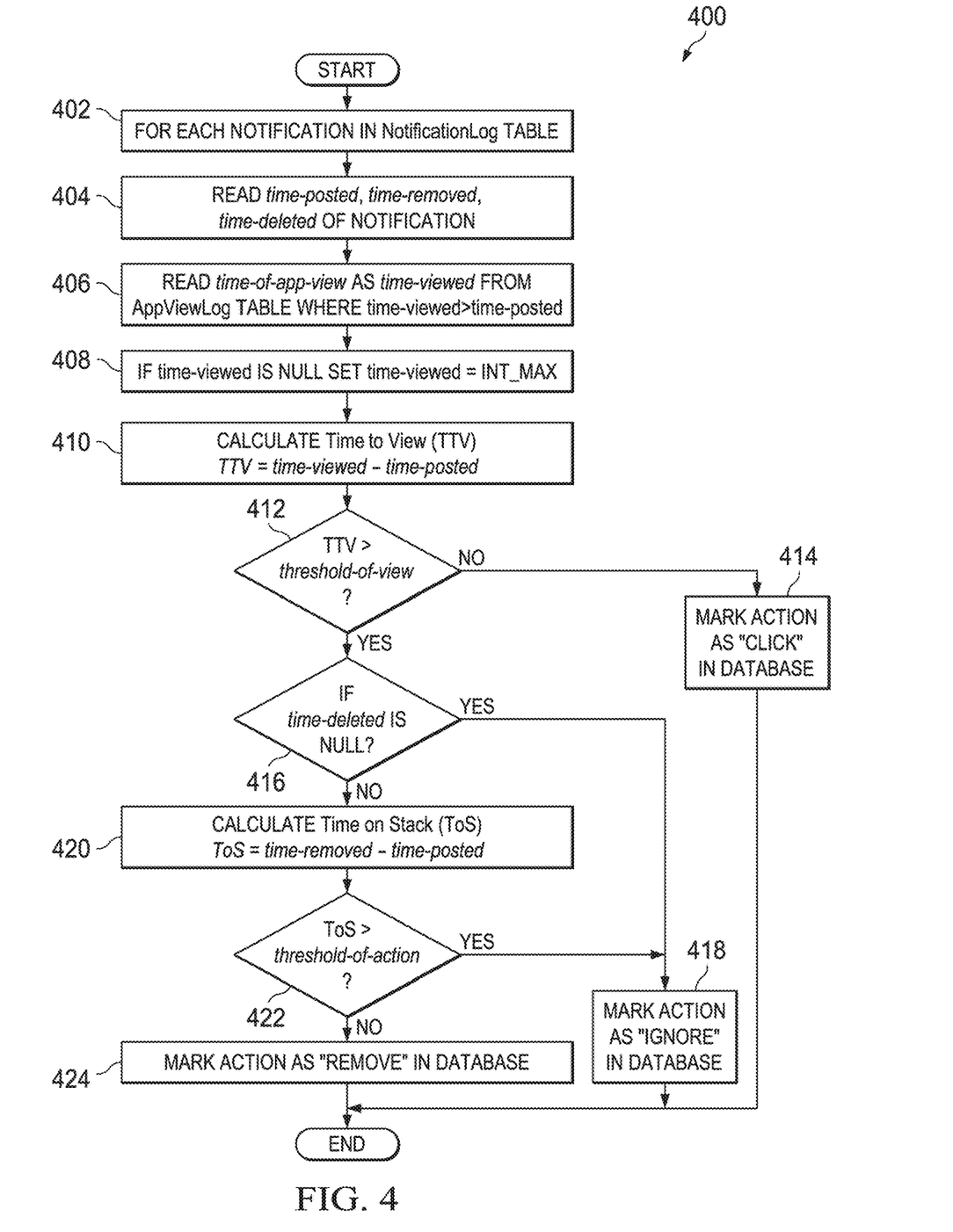
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the personalization of delivery of notifications, in accordance with an embodiment. In an embodiment, one or more operations of flow 400 may be performed by notification engines 110a-110c, user preference engines 114a-114c, notification delivery engines 116a-116c, and network notification engine 120. At 402, each notification in a notification table is read. At 404, for each notification in the notification table, a time posted, time removed, or time deleted for the notification is determined. At 406, the time when the notification was viewed (if it was viewed) is determined. At 408, if the notification was not viewed (i.e., time viewed=NULL) then the time viewed is set to a maximum time. The maximum time can dependent on the type of notification, if the user's device was operational, if the user was available, etc. At 410, a time to view is calculated. For example, the time to view may be the time viewed minus the time the notification was posted. At 412, the system determines if the time to view is greater than a threshold to view the notification. The threshold to view the notification can vary by each notification and can depend on the type of notification, if the user's device was operational, if the user was available, etc. If the time to view was not greater than a threshold to view, then a click or user action is recorded as the interaction that the user had with the notification, as in 414.

If the time to view was greater than a threshold view, then the system determines if the amount of time that the notification was deleted or removed from the system where the notification was delivered is NULL or no value, as in 416. If the amount of time until the notification was deleted or removed from the system where the notification was delivered is NULL or has no value, then the user is determined to have ignored the notification, as in 418. If the amount of time until the notification was deleted or removed from the system where the notification was delivered is not NULL or has a value, then the system determines an amount of time that the notification has been on the notification stack, as in 420. At 422, the system determines if the amount of time that the notification has been on the notification stack is greater than a threshold time of action. The threshold time of action can vary by each notification and can depend on can dependent on the type of notification, if the user's device was operational, if the user was available, etc. If the amount of time that the notification has been on the notification stack is greater than a threshold time of action, then the user is determined to have ignored the notification, as in 418. If the amount of time that the notification has been on the notification stack is not greater than a threshold time of action, then the user is determined to have removed or deleted the notification, as in 424.

Figure 5:
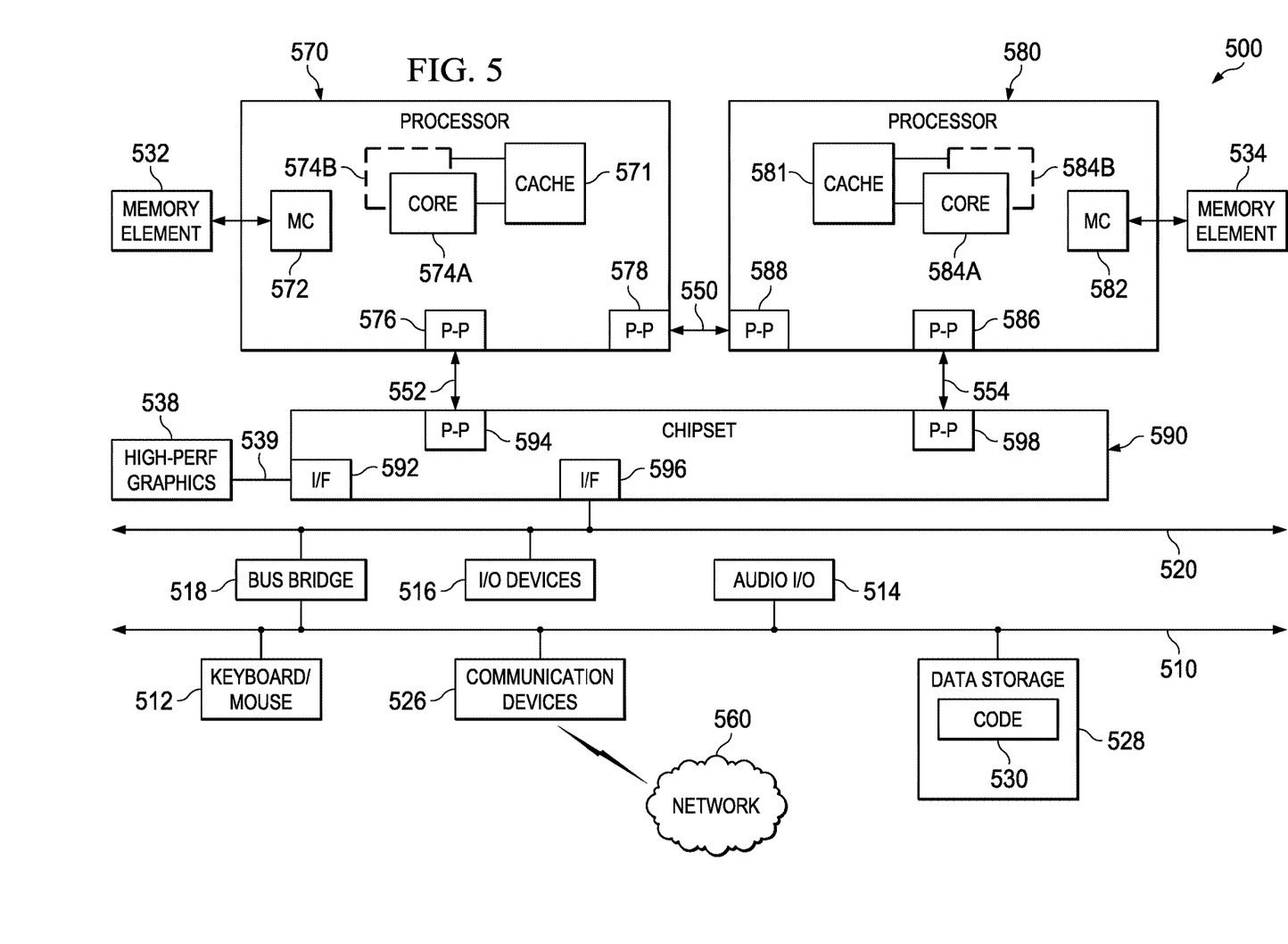
FIG. 5 is a block diagram illustrating an example computing system that is arranged in a point-to-point configuration in accordance with an embodiment.

Turning to FIG. 5, FIG. 5 illustrates a computing system 500 that is arranged in a point-to-point (PtP) configuration according to an embodiment. In particular, FIG. 5 shows a system where processors, memory, and input/output devices are interconnected by a number of point-to-point interfaces. Generally, one or more of the network elements of communication system 100 may be configured in the same or similar manner as computing system 500. More specifically, notification engines 110a-110c, user preference engines 114a-114c, notification delivery engines 116a-116c, and network notification engine 120 can be configured in the same or similar manner as computing system 500.

As illustrated in FIG. 5, system 500 may include several processors, of which only two, processors 570 and 580, are shown for clarity. While two processors 570 and 580 are shown, it is to be understood that an embodiment of system 500 may also include only one such processor. Processors 570 and 580 may each include a set of cores (i.e., processor cores 574A and 574B and processor cores 584A and 584B) to execute multiple threads of a program. The cores may be configured to execute instruction code in a manner similar to that discussed above with reference to FIGS. 3 and 4. Each processor 570, 580 may include at least one shared cache

571, 581. Shared caches 571, 581 may store data (e.g., instructions) that are utilized by one or more components of processors 570, 580, such as processor cores 574 and 584.

Processors 570 and 580 may also each include integrated memory controller logic (MC) 572 and 582 to communicate with memory elements 532 and 534. Memory elements 532 and/or 534 may store various data used by processors 570 and 580. In alternative embodiments, memory controller logic 572 and 582 may be discrete logic separate from processors 570 and 580.

Processors 570 and 580 may be any type of processor, and may exchange data via a point-to-point (PtP) interface 550 using point-to-point interface circuits 578 and 588, respectively. Processors 570 and 580 may each exchange data with a control logic 590 via individual point-to-point interfaces 552 and 554 using point-to-point interface circuits 576, 586, 594, and 598. Control logic 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Control logic 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a keyboard/mouse 512 (or other input devices such as a touch screen, trackball, etc.), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, internet-of-things devices, constrained devices (sensors, actuators, controllers), appliances, small wearables, health and quantified-self devices, industrial, devices, etc. It will be appreciated that these mobile devices may be provided with SoC architectures in at least some embodiments.

Figure 6:
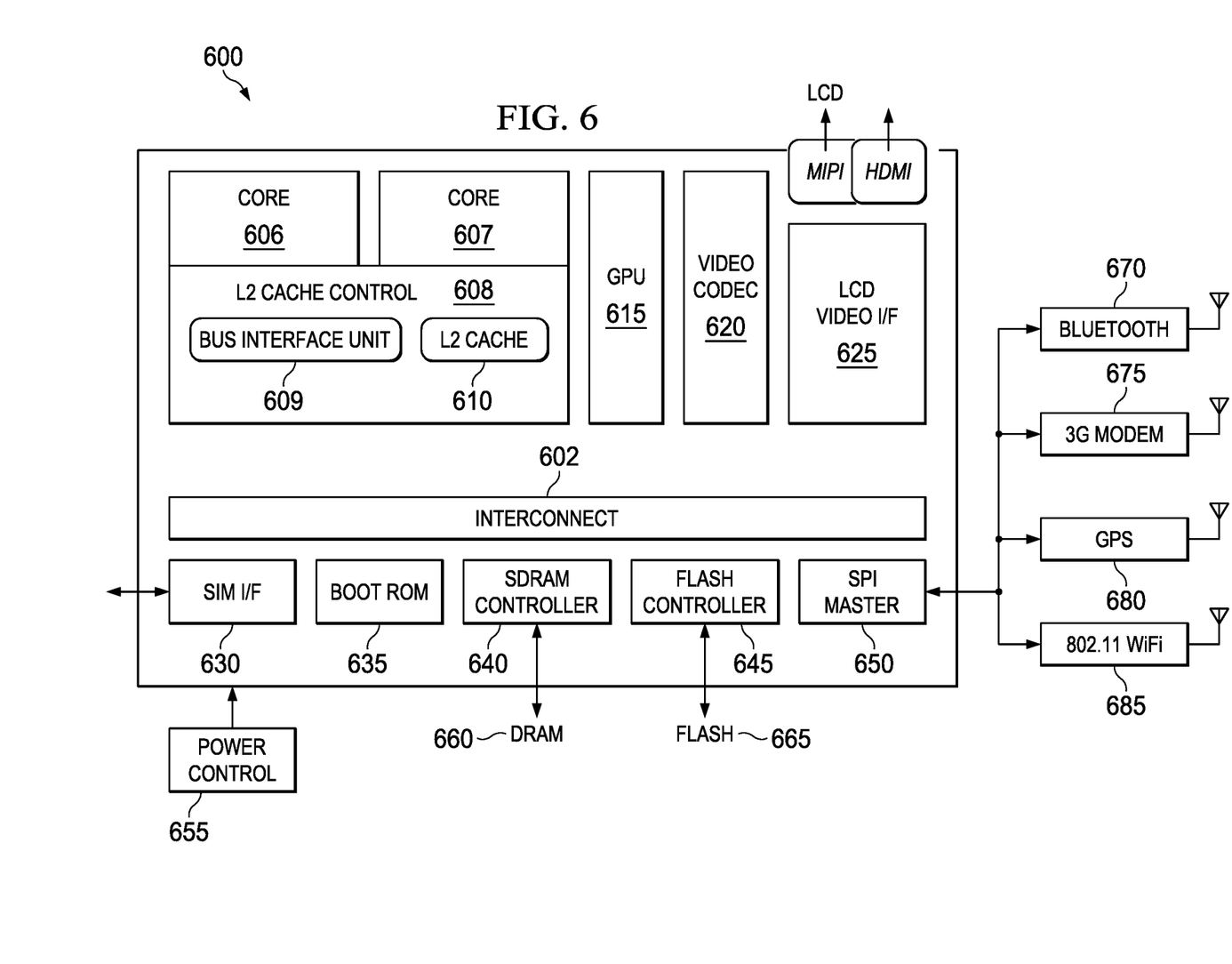
FIG. 6 is a simplified block diagram associated with an example ARM ecosystem system on chip (SOC) of the present disclosure.

Turning to FIG. 6, FIG. 6 is a simplified block diagram associated with an example SOC 600 of the present disclosure. At least one example implementation of the present disclosure can include the protected data collection features discussed herein. For example, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc. In an example, notification engines 110*a*-110*c*, user preference engines 114*a*-114*c*, notification delivery engines 116*a*-116*c*, and network notification engine 120 can be configured in the same or similar architecture as SOC 600.

In this example of FIG. 6, SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LCD.

SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more embodiments include one or more communication capabilities, interfaces, and features such as instances of Bluetooth™ 670, a 3G modem 675, a global positioning system (GPS) 680, and an 802.11 Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 7:
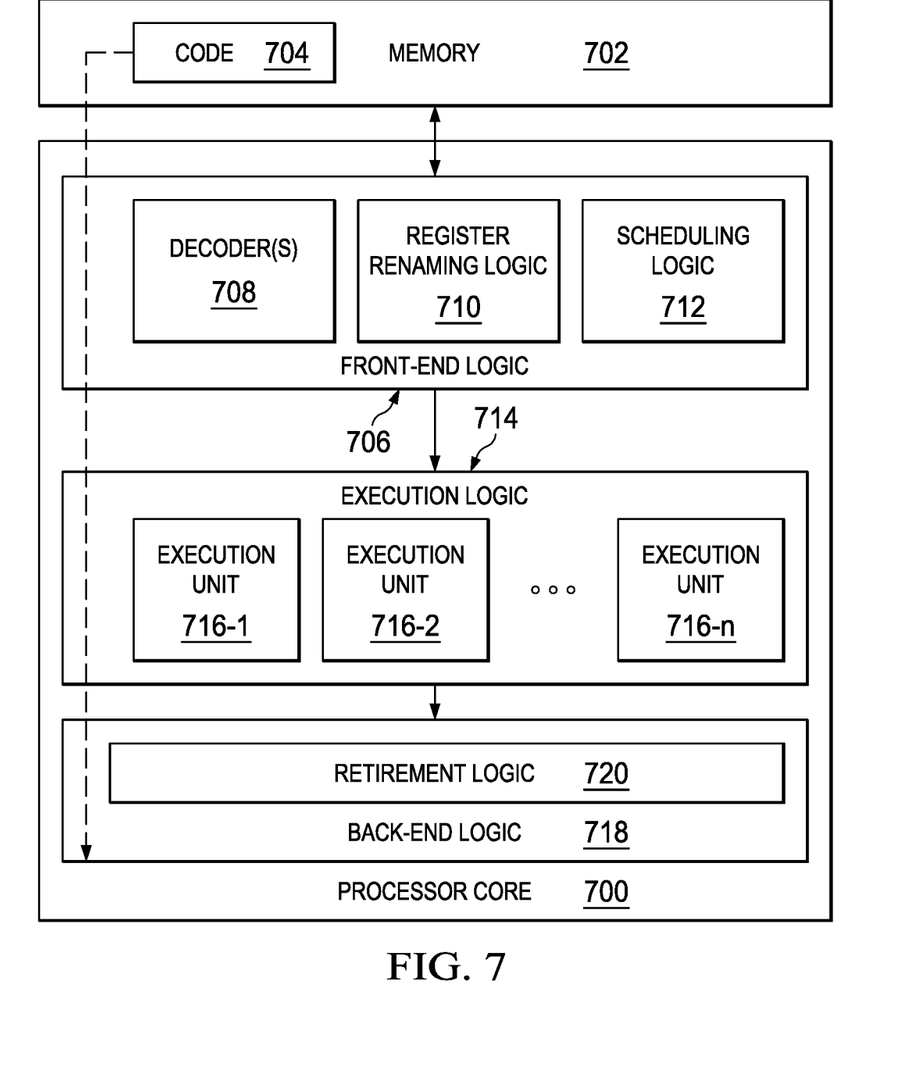
FIG. 7 is a block diagram illustrating an example processor core in accordance with an embodiment.

FIG. 7 illustrates a processor core 700 according to an embodiment. Processor core 7 may be the core for any type of processor, such as a micro-processor, an embedded processor, a digital signal processor (DSP), a network processor, or other device to execute code. Although only one processor core 700 is illustrated in FIG. 7, a processor may alternatively include more than one of the processor core 700 illustrated in FIG. 7. For example, processor core 700 represents an embodiment of processors cores 574*a*, 574*b*, 584*a*, and 584*b* shown and described with reference to processors 570 and 580 of FIG. 5. Processor core 700 may be a single-threaded core or, for at least one embodiment, processor core 700 may be multithreaded in that it may include more than one hardware thread context (or "logical processor") per core.

FIG. 7 also illustrates a memory 702 coupled to processor core 700 in accordance with an embodiment. Memory 702 may be any of a wide variety of memories (including various layers of memory hierarchy) as are known or otherwise available to those of skill in the art. Memory 702 may include code 704, which may be one or more instructions, to be executed by processor core 700. Processor core 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor core 700 can also include execution logic 714 having a set of execution units 716-1 through 716-N. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor core 700 allows out of order execution but requires in order retirement of instructions. Retirement logic 720 may take a variety of known forms (e.g., re-order buffers or the like). In this manner, processor core 700 is transformed during execution of code 704, at least in terms of the output generated by the decoder, hardware registers and tables utilized by register renaming logic 710, and any registers (not shown) modified by execution logic 714.

Although not illustrated in FIG. 7, a processor may include other elements on a chip with processor core 700, at least some of which were shown and described herein with reference to FIG. 5. For example, as shown in FIG. 5, a processor may include memory control logic along with processor core 700. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams (i.e., FIGS. 3 and 4) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one computer readable medium having one or more instructions that when executed by at least one processor cause the at least one processor to receive a notification for a user, assign a relevance to the notification, where the relevance is based on a stored user's preference, determine a device to which the notification will be communicated, determine a delivery mechanism for the notification, where the delivery mechanism is based on the determined device and the stored user's preference, and communicate the notification to the determined device.

In Example C2, the subject matter of Example C1 can optionally include where the user's preference is based on how the user interacted with similar notifications in the past.

In Example C3, the subject matter of any one of Examples C1-C2 can optionally include where the instructions, when executed by the by at least one processor, further cause the at least one processor to determine how the user interacted with the notification, and update the stored user's preference based on how the user interacted with the notification.

In Example C4, the subject matter of any one of Examples C1-C3 can optionally include where the instructions, when executed by the by at least one processor, further cause the at least one processor to determine a second device to which the notification will be communicated and determine a second delivery mechanism for the notification, where the second delivery mechanism is based on the determined second device and the stored user's preference, where the second delivery mechanism is different than the delivery mechanism.

In Example C5, the subject matter of any one of Examples C1-C4 can optionally include where the delivery mechanism for the notification is a graphic to be displayed on the device and the second delivery mechanism for the notification is an audible sound to be played on the second device.

In Example, C6, the subject matter of any one of Examples C1-05 can optionally include where the user's preference is based at least in part on how the user interacted with similar notifications in the past and the similar notifications are similar in nature or similar in timing.

In Example, C7, the subject matter of any one of Examples C1-C6 can optionally include where the user's preference is based at least in part on how the user interacted with similar notifications in the past and the similar notifications are environment alerts, traffic alerts, or commerce alerts.

In Example, C8, the subject matter of any one of Examples C1-C7 can optionally include where the user's preference is based at least in part on how the user interacted with similar notifications in the past and the similar notifications are similar in priority or on the amount of time the notifications spend on a system that includes the at least one computer readable medium.

In Example A1, an apparatus can include a notification engine, where the notification engine is configured to receive a notification for a user, assign a relevance to the notification, where the relevance is based on a stored user's preference, determine a device to which the notification will be communicated, determine a delivery mechanism for the notification, where the delivery mechanism is based on the determined device and the stored user's preference, and communicate the notification to the determined device.

In Example, A2, the subject matter of Example A1 can optionally include where the user's preference is based on how the user interacted with similar notifications in the past.

In Example A3, the subject matter of any one of Examples A1-A2 can optionally include where the notification engine is further configured to determine how the user interacted with the notification and update the stored user's preference based on how the user interacted with the notification.

In Example A4, the subject matter of any one of Examples A1-A3 can optionally include where the notification engine is further configured to determine a second device to which the notification will be communicated and determine a second delivery mechanism for the notification, where the second delivery mechanism is based on the determined second device and the stored user's preference, where the second delivery mechanism is different than the delivery mechanism.

In Example A5, the subject matter of any one of Examples A1-A4 can optionally include where the delivery mechanism for the notification is a graphic to be displayed on the device and the second delivery mechanism for the notification is an audible sound to be played on the second device.

Example M1 is a method including receiving a notification for a user, assigning a relevance to the notification, where the relevance is based on a stored user's preference, determining a device to which the notification will be communicated, determining a delivery mechanism for the notification, where the delivery mechanism is based on the determined device and the stored user's preference, and communicating the notification of the determined device.

In Example M2, the subject matter of Example M1 can optionally include where the user's preference is based on how the user interacted with similar notifications in the past.

In Example M3, the subject matter of any one of the Examples M1-M2 can optionally include determining how the user interacted with the notification and updating the stored user's preference based on how the user interacted with the notification.

In Example M4, the subject matter of any one of the Examples M1-M3 can optionally include determining a second device to which notification will be communicated and determining a second delivery mechanism for the notification, where the second delivery mechanism is based on the determined second device and the stored user's preference, where the second delivery mechanism is different than the delivery mechanism.

In Example M5, the subject matter of any of the Examples M1-M4 can optionally include where the delivery mechanism for the notification is a graphic to be displayed on the device and the second delivery mechanism for the notification is an audible sound to be played on the second device.

Example S1 is a system for personalization of delivery of notifications, the system including a notification engine, where the notification engine is configured to receive a notification for a user, assign a relevance to the notification, where the relevance is based on a stored user's preference, determine a device to which the notification will be communicated, determine a delivery mechanism for the notification, where the delivery mechanism is based on the determined device and the stored user's preference, and communicate the notification to the determined device.

In Example S2, the subject matter of Example S1 can optionally include where the user's preference is based on how the user interacted with similar notifications in the past.

In Example S3, the subject matter of any of the Examples S1-S2 can optionally include where the notification engine is further configured to determine how the user interacted with the notification and update the stored user's preference based on how the user interacted with the notification.

In Example S4, the subject matter of any of the Examples S1-S2 can optionally include where the authentication engine is further configured to determine a second device to which notification will be communicated and determine a second delivery mechanism for the notification, where the second delivery mechanism is based on the determined second device and the stored user's preference, where the second delivery mechanism is different than the delivery mechanism.

In Example S5, the subject matter of any of the Examples S1-S2 can optionally include where the delivery mechanism for the notification is a graphic to be displayed on the device and the second delivery mechanism for the notification is an audible sound to be played on the second device.

Example X1 is a machine-readable storage medium including machine-readable instructions to implement a method or realize an apparatus as in any one of the Examples A1-A5, or M1-M5. Example Y1 is an apparatus comprising means for performing of any of the Example methods M1-M5. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor, cause the at least one processor to:
   intercept a first notification for a user sent from a notification server;
   determine a stored user's preference for a first device and a first delivery mechanism, wherein the stored user's preference is based at least in part on how the user interacted with similar notifications in the past;
   assign a relevance to the first notification, wherein the relevance is based at least in part on a stored user's preference and on one or more of: a reputation of the application sending the notification, a relationship between a sender and the user, and semantics of the notification content;
   communicate the first notification to the determined first device according to the determined first delivery mechanism;
   determine how the user interacted with first the notification;
   update the stored user's preference based on how the user interacted with the first notification;
   intercept a second notification for the user sent from the notification server;
   assign a relevance to the second notification, wherein the relevance is based at least in part on the updated stored user's preference;

determine the stored user's preference for a second device and a second delivery mechanism;

determine whether to communicate the second notification to the second device using the second delivery mechanism;

communicate the second notification to the determined second device according to the determined second delivery mechanism; and update the stored user's preference based on how the user interacted with the second notification on the second device.

2. The at least one machine readable medium of claim 1, wherein the first delivery mechanism and the second delivery mechanism are different delivery mechanisms.

3. The at least one machine readable medium of claim 1, wherein the first delivery mechanism is a visual alert and the second delivery mechanism is an audible alert.

4. The at least one machine readable medium of claim 3, wherein the visual alert includes a static graphic, a graphics interchange format (GIF), a video alert, a flashing light, or a moving graphic.

5. The at least one machine readable medium of claim 1, wherein the first delivery mechanism and the second delivery mechanism are a same delivery mechanism.

6. An apparatus comprising:
a hardware-based processor; and
a notification engine, executable by the hardware-based processor, wherein the notification engine is configured to:
intercept a first notification for a user sent from a notification server;
determine a stored user's preference for a first device and a first delivery mechanism, wherein the stored user's preference is based at least in part on how the user interacted with similar notifications in the past;
assign a relevance to the first notification, wherein the relevance is based at least in part on a stored user's preference and on one or more of: a reputation of the application sending the notification, a relationship between a sender and the user, and semantics of the notification content;
communicate the first notification to the determined first device according to the determined first delivery mechanism;
determine how the user interacted with the first notification;
update the stored user's preference based on how the user interacted with the first notification;
intercept a second notification for the user sent from the notification server;
assign a relevance to the second notification, wherein the relevance is based at least in part on the updated stored user's preference;
determine the stored user's preference for a second device and a second delivery mechanism;
determine whether to communicate the second notification to the second device using the second delivery mechanism;
communicate the second notification to the determined second device according to the determined second delivery mechanism; and
update the stored user's preference based on how the user interacted with the second notification on the second device.

7. The apparatus of claim 6, wherein the first delivery mechanism and the second delivery mechanism are different delivery mechanisms.

8. The apparatus of claim 7, wherein the first delivery mechanism is a visual alert and the second delivery mechanism is an audible alert.

9. The apparatus of claim 8, wherein the visual alert includes a static graphic, a graphics interchange format (GIF), a video alert, a flashing light, or a moving graphic.

10. The apparatus of claim 6, wherein the first delivery mechanism and the second delivery mechanism are a same delivery mechanism.

11. A method comprising:
intercepting a first notification for a user sent from a notification server;
determining a stored user's preference for a first device and a first delivery mechanism, wherein the stored user's preference is based at least in part on how the user interacted with similar notifications in the past;
assigning a relevance to the first notification, wherein the relevance is based at least in part on a stored user's preference and on one or more of: a reputation of the application sending the notification, a relationship between a sender and the user, and semantics of the notification content;
communicating the first notification to the determined first device according to the determined first delivery mechanism;
determining how the user interacted with the first notification;
updating the stored user's preference based on how the user interacted with the first notification;
intercepting a second notification for the user sent from the notification server;
assigning a relevance to the second notification, wherein the relevance is based at least in part on the updated stored user's preference;
determining the stored user's preference for a second device and a second delivery mechanism;
determining whether to communicate the second notification to the second device using the second delivery mechanism;
communicating the second notification to the determined second device according to the determined second delivery mechanism; and
updating the stored user's preference based on how the user interacted with the second notification on the second device.

12. The method of claim 11, wherein the first delivery mechanism and the second delivery mechanism are different delivery mechanisms.

13. The method of claim 12, wherein the first delivery mechanism is an audible alert and the second delivery mechanism is a visual alert.

14. The method of claim 11, wherein the first delivery mechanism and the second delivery mechanism are a same delivery mechanism.

* * * * *